US012477266B2

(12) United States Patent
Zhan

(10) Patent No.: US 12,477,266 B2
(45) Date of Patent: Nov. 18, 2025

(54) ANTI-DROP HANGING RING OF EARPHONE

(71) Applicant: Kun-Tai Zhan, Taichung (TW)

(72) Inventor: Kun-Tai Zhan, Taichung (TW)

( * ) Notice: Subject to any disclaimer, the term of this patent is extended or adjusted under 35 U.S.C. 154(b) by 225 days.

(21) Appl. No.: 18/212,231

(22) Filed: Jun. 21, 2023

(65) Prior Publication Data

US 2024/0163598 A1 May 16, 2024

(30) Foreign Application Priority Data

Jun. 21, 2022 (TW) ................................ 111206558

(51) Int. Cl.
*H04R 1/10* (2006.01)

(52) U.S. Cl.
CPC ........... *H04R 1/105* (2013.01); *H04R 1/1066* (2013.01); *H04R 1/1016* (2013.01)

(58) Field of Classification Search
CPC .... H04R 1/105; H04R 1/1066; H04R 1/1016; H04R 25/60; H04R 25/656
See application file for complete search history.

(56) References Cited

U.S. PATENT DOCUMENTS

| | | | | | |
|---|---|---|---|---|---|
| 1,893,143 | A * | 1/1933 | Koch | H04R 25/60 | 181/135 |
| 5,712,453 | A * | 1/1998 | Bungardt | H04R 1/1066 | 181/135 |
| 8,873,786 | B2 * | 10/2014 | Larsen | H04R 25/656 | 381/328 |
| 2019/0029593 | A1 * | 1/2019 | Orron | H04R 1/105 | |
| 2020/0304898 | A1 * | 9/2020 | Cohen | H04R 1/1016 | |

FOREIGN PATENT DOCUMENTS

| | | | | |
|---|---|---|---|---|
| GB | 2464990 | A * | 5/2010 | H04R 1/1016 |

* cited by examiner

*Primary Examiner* — Angelica M McKinney
(74) *Attorney, Agent, or Firm* — Che-Yang Chen

(57) ABSTRACT

An anti-drop hanging ring of earphone for stably wearing an earphone is disclosed. The anti-drop hanging ring includes an elastic collar having an outer side and an inner side; an elastic connection part disposed on an outer side of the elastic collar; an end disposed on a portion of the elastic connection part away from the elastic collar. The elastic collar is attached with an earphone. When the earphone is worn on an ear, the end is abutted with an auricle of the ear.

16 Claims, 12 Drawing Sheets

ANTI-DROP HANGING RING OF EARPHONE

BACKGROUND OF THE INVENTION

1. Field of the Invention

The present invention relates to an anti-drop hanging ring. More particularly, the present invention relates to an anti-drop hanging ring applied to an earphone.

2. Description of the Related Art

In prior art, conventional earphones can be divided into earmuff-type earphones and ear-canal-type earphones, the ear-canal-type earphones can be divided into in-ear-type earphones and earplug-type earphones. The earmuff-type earphone includes an earmuff part and an earphone, and the earmuff part covers entire ear, so the earmuff-type earphone is usually bulky and has the most stable wearing effect. The ear-canal-type earphone usually has only one earphone body, and a user wears the ear-canal-type earphone by inserting a head of the earphone into the ear canal or mounting the earphone body in the auricle. The ear-canal-type earphone is smaller in size. Mobile devices such as mobile phones and tablet computers are often used in modern society, and they are all moving towards lightweight and miniaturized designs in consideration of the needs of portability. Therefore, ear-canal-type earphone is mainly used for these mobile devices. In recent years, wireless Bluetooth ear-canal-type earphones has been developed, the body of this type of earphone is supported by a head of earphone inserted into the ear canal, or is abutted with the auricle for support, so the ear-canal-type earphone is easy to fall off.

In order to prevent the ear-canal-type earphone from falling off, a kind of ear-hook earphone has been developed. The ear-hook earphone includes an ear-hook part and an ear-canal-type earphone. The size of the ear-hook part is much smaller than an earmuff, the wearing stability of an earphone can be greatly improved by the ear-hook part. In particular, for sporty users, the ear-hook earphone is most preferred.

The ear-hook parts of the conventional ear-hook earphone can be divided into the type of wearing on the ear, and the type of wearing against an inner side of an auricle, and a size of the former is larger than that of the latter. However, the ear-hook part of each of the above-mentioned ear-hook earphone is fixedly assembled with the earphone, that is, each of the two conventional ear-hook parts can only be assembled on the earphone of the same shape, so that the wearing manners of the two ear-hook parts are also unchangeable. However, users' ears have difference in size and contour, especially the inner auricles of users' ears have more difference, so the conventional ear-hook part with the unchangeable wearing manner is easy to rub against the same position of the ear or the auricle, and it discomforts the user.

SUMMARY OF THE INVENTION

Therefore, an objective of the present invention is to provide an anti-drop hanging ring of earphone, the anti-drop hanging ring can be applied to earphone of various shapes and easy to adjust a wearing position on an inner side of an auricle.

In order to achieve the objective, the present invention discloses an anti-drop hanging ring of earphone, and the anti-drop hanging ring is applied to stably wearing an earphone, and includes an elastic collar, an elastic connection part and an end. The elastic collar has an outer side and an inner side. The elastic connection part is disposed on the outer side of the elastic collar. The end is disposed on a portion of the elastic connection part away from the elastic collar, wherein the elastic collar is configured to attach with an earphone, when the earphone is worn on an ear, the end is abutted with an auricle of the ear.

According to an embodiment of the present invention, the elastic connection part can be in a cylinder shape, and the end can be in a sphere shape.

According to an embodiment of the present invention, the elastic collar, the elastic connection part and the end are integrally formed with each other.

According to an embodiment of the present invention, the elastic collar has a notch.

According to an embodiment of the present invention, an inner side of the elastic collar forms a closed hole, and two end openings of the closed hole have different internal diameters.

According to an embodiment of the present invention, at least one of the elastic collar, the elastic connection part and the end is made by silicone.

According to an embodiment of the present invention, a portion of the elastic connection part near the elastic collar is thicker than another portion of the elastic connection part near the end.

According to an embodiment of the present invention, outer sides of the elastic connection part and the elastic collar form an acute angle, to make the end extend beyond a plane of an end opening of the elastic collar.

According to an embodiment of the present invention, the end has a high friction surface or an elastic surface.

According to an embodiment of the present invention, the elastic collar enables the hanging ring of the present invention to be applied to earphones in various shapes, the elastic connection part enables the end of the hanging ring of the present invention to be easily adjusted to adaptively abut with different position on the inner side of the auricle. Furthermore, the end can have a high friction surface or an elastic surface to improve stability and comfort of wearing an earphone.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1B:
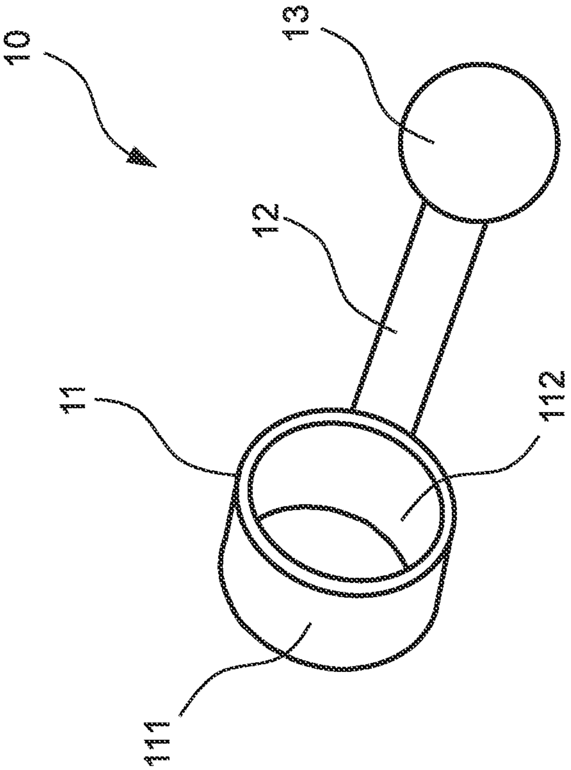
FIG. 1B is another perspective view of the first embodiment of an anti-drop hanging ring of earphone, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms “a”, “an” and “the” are intended to include the plural forms as well, unless the context clearly indicates otherwise.

It is to be acknowledged that, although the terms ‘first’, ‘second’, ‘third’, and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term “or” includes any and all combinations of one or more of the associated listed items.

It will be acknowledged that when an element or layer is referred to as being “on,” “connected to” or “coupled to” another element or layer, it can be directly on, connected or coupled to the other element or layer, or intervening elements or layers may be present. In contrast, when an element is referred to as being “directly on,” “directly connected to” or “directly coupled to” another element or layer, there are no intervening elements or layers present.

In addition, unless explicitly described to the contrary, the words “comprise” and “include”, and variations such as “comprises”, “comprising”, “includes”, or “including”, will be acknowledged to imply the inclusion of stated elements but not the exclusion of any other elements.

Figure 1A:
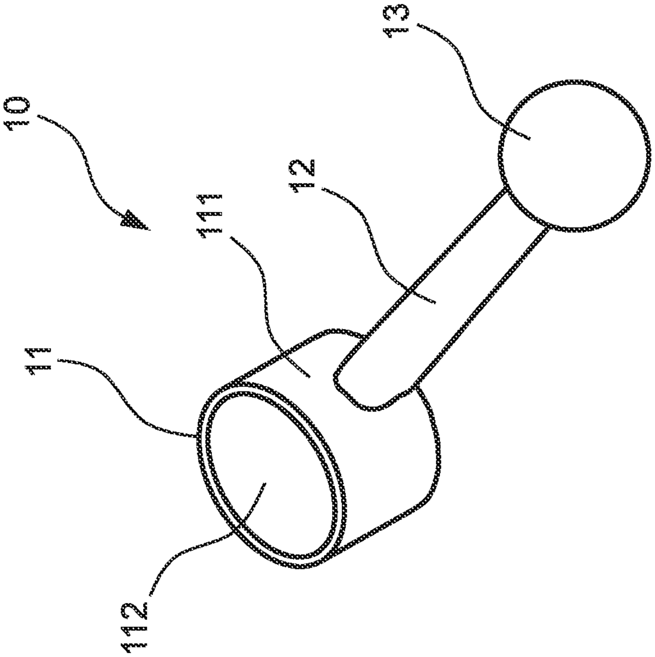
FIG. 1A is a perspective view of a first embodiment of an anti-drop hanging ring of earphone, according to the present invention.

Please refer to FIGS. 1A and 1B, which are different perspective views of a first embodiment of an anti-drop hanging ring of earphone, according to the present invention. In the first embodiment of the present invention, an anti-drop hanging ring 10 is configured to stabilize a worn earphone. The anti-drop hanging ring 10 includes an elastic collar 11, an elastic connection part 12 and an end 13. The elastic collar 11 is in a cylinder shape having an outer side 111 and an inner side 112. The elastic connection part 12 is disposed on an outer side 111 of the elastic collar 11. In a preferred embodiment of the present invention, the elastic connection part 12 has a lengthwise body extended outwardly from the outer side 111 along a radial direction of the elastic collar 11. The end 13 is disposed on a portion of the elastic connection part 12 away from an end of the elastic collar 11. The elastic collar 11 can be attached or assembled with the earphones 31 in various shapes, as shown in FIGS. 3A to 3D, and FIGS. 5A to 5B; when the ear phone 30 is worn on an ear 30, the end 13 can be abutted with different position on an inner side of an auricle of the ear 30.

In a preferred embodiment of the present invention, the elastic collar 11, the elastic connection part 12 and the end 13 are integrally formed with each other, but not the present invention is not limited to the example. In a preferred embodiment of the present invention, each of the elastic collar 11 and the elastic connection part 12 can be made by silicone; the end 13 can have a high friction surface or an elastic surface, or be made by skin-friendly material, to make the stability and comfort of wearing the earphone when the end 13 is abutted with different position on the inner side of the auricle of the ear 30. Furthermore, the elastic connection part 12 can provide the end 13 with elasticity, the end 13 can apply different pushing force on the auricle when abutting with different position on the inner side of the auricle, so that the user can freely adjust the position of the end 13 when wearing the earphone 31, to avoid the discomfort on the inner side of the auricle caused by the end 13 abutting the same position too long, and improve comfort of wearing the earphone. In a preferred embodiment of the present invention, the elastic connection part can be in a cylinder shape; in a preferred embodiment of the present invention, the end can be in a sphere shape, and a diameter of the sphere shape is about 4-5 millimeters, but the present invention is not limited to above-mentioned examples, and the end 13 can be in various designs such as cat’s paw.

Figure 5A:
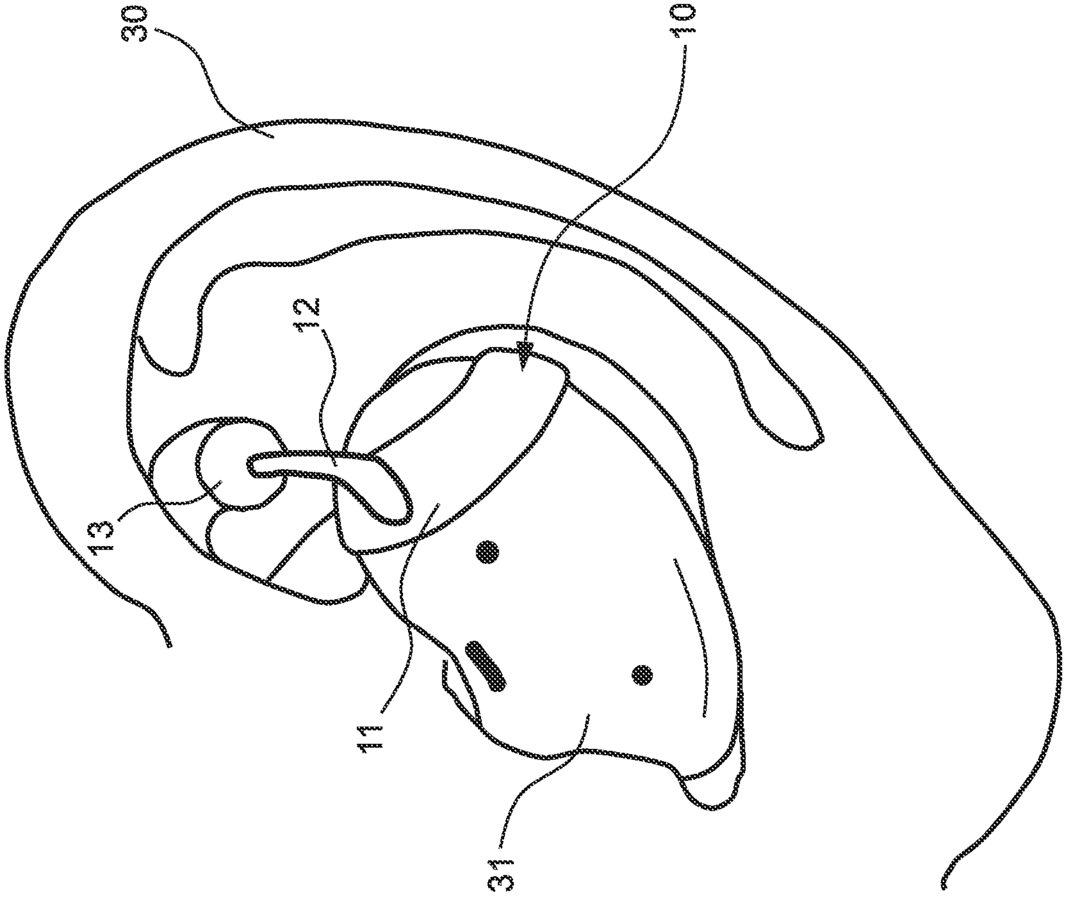
FIGS. 5A to 5B are side views of manners of wearing anti-drop hanging ring assembled with different bean-type earphone.
Figure 5B:
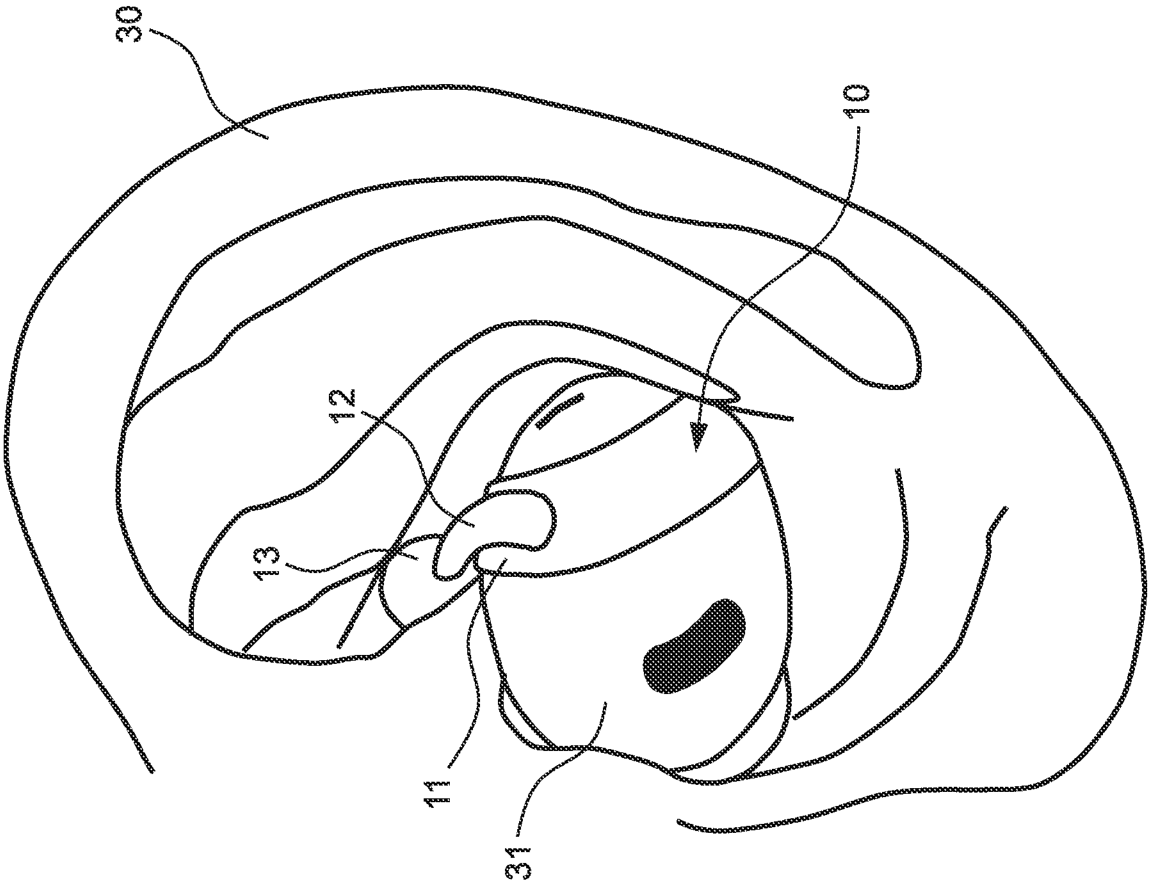

In an embodiment of the present invention, the elastic collar 11 has a notch and made by plastic, the elastic collar 11 can be enlarged through the notch to mount on the earphone 31, an inner side 112 of the elastic collar 11 forms a closed hole, the hole can be enlarged through the elastic material to easily mount on a portion of the earphone 31 with different thickness or different outlines. Furthermore, two end openings of the elastic collar 11 have different internal diameters, to make the inner side 112 of the elastic collar 11 easily attach on the curved surface of the earphone 31 in a bean shape, as shown in FIGS. 5A and 5B.

Figure 2B:
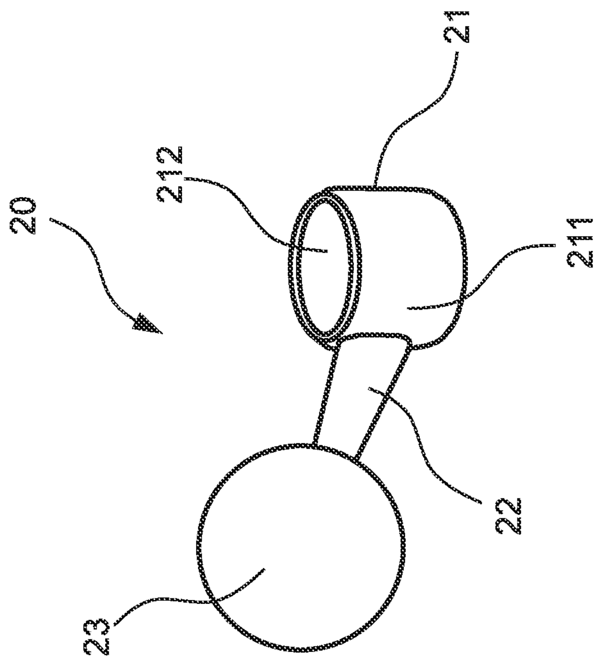
FIG. 2B is another perspective view of the second embodiment of an anti-drop hanging ring of earphone, according to the present invention.
Figure 2A:
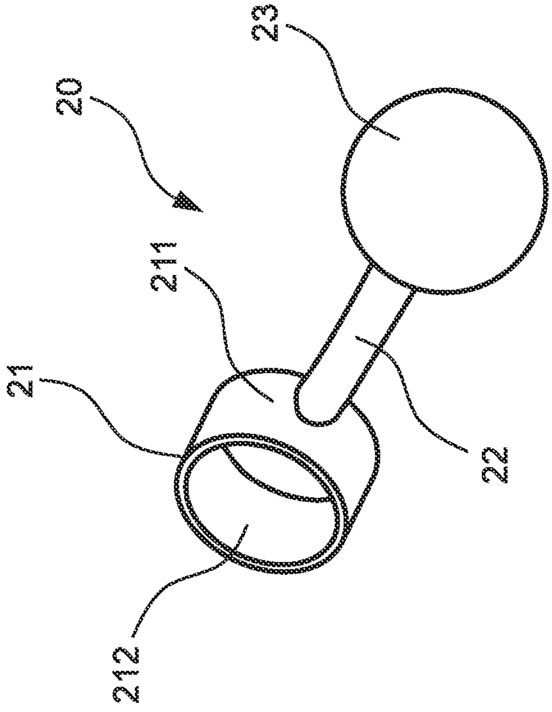
FIG. 2A is a perspective view of a second embodiment of an anti-drop hanging ring of earphone, according to the present invention.
Figure 4:
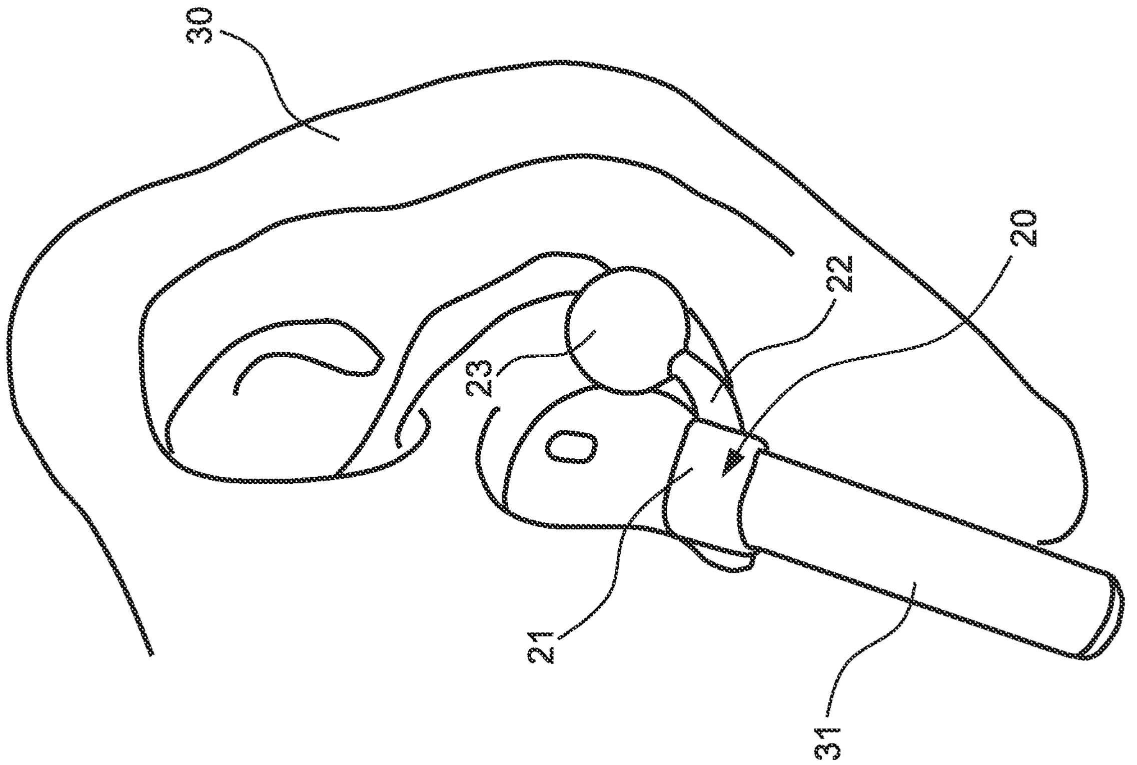
FIG. 4 is a side view of a manner of wearing the anti-drop hanging ring assembled with another type of AirPods earphone, according to the second embodiment of the present invention.

Please refer to FIGS. 2A and 2B, which show different perspective views of a second embodiment of an anti-drop hanging ring of earphone, according to the present invention. In the second embodiment of the present invention, an anti-drop hanging ring 20 is configured to stabilize a worn earphone. The anti-drop hanging ring 20 includes an elastic collar 21, an elastic connection part 22 and an end 23. The elastic collar 21 is in a cylinder shape having an outer side 211 and an inner side 212. The elastic connection part 22 is disposed on the outer side 211 of the elastic collar 21. In a preferred embodiment of the present invention, the elastic connection part 22 has a lengthwise body extended outwardly therefrom along a radial direction of the elastic collar 21 from the outer side 211. The end 23 is disposed on an end of the elastic connection part 22 away from the elastic collar 21. The elastic collar 21 can be attached or assembled with the earphones 31 in various shapes (as shown in FIG. 4), so that when the ear phone 30 is worn on an ear 30, the end 23 can be abutted with different position on an inner side of an auricle of the ear 30.

In the second embodiment of the present invention, the difference between the first embodiment and the second embodiment is that in the second embodiment the end 23 is in a sphere shape; however, the present invention is not limited to the above-mentioned example, the end 23 can be in various designs, such as cat's paw. The sphere formed by the end 23 is slightly larger than that formed by the end 13. In a preferred embodiment of the present invention, the elastic connection part 22 can be in a cylinder shape, and a portion of the cylinder of the elastic connection part 22 near the elastic collar 21 is thinner, to make the end 23 have elasticity to abut with different position on the inner side of the auricle, so that the user can freely adjust the position of the end 23; another portion of the cylinder of the elastic connection part 22 near the end 23 is thicker, so that the elastic connection part 22 is not easy to break from the elastic collar 21.

Figure 6:
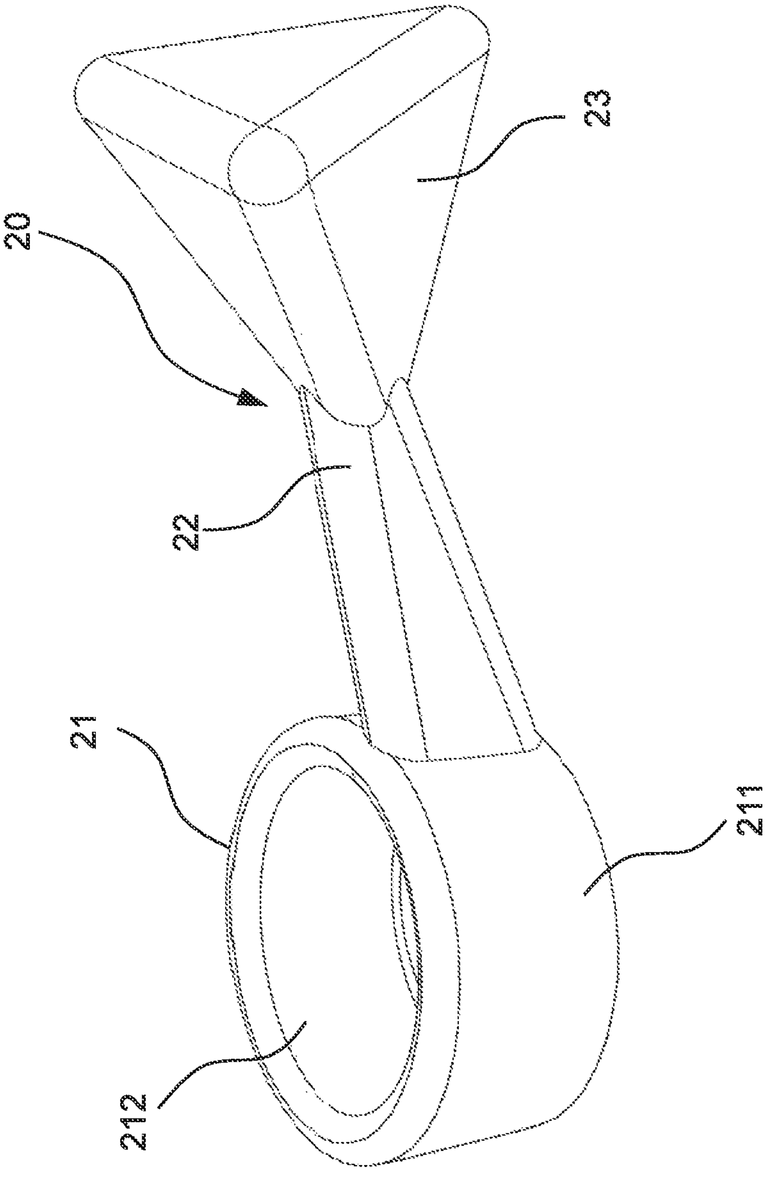
FIGS. 6 to 7 are the other embodiments of an anti-drop hanging ring of earphone, according to the present invention.
Figure 7:
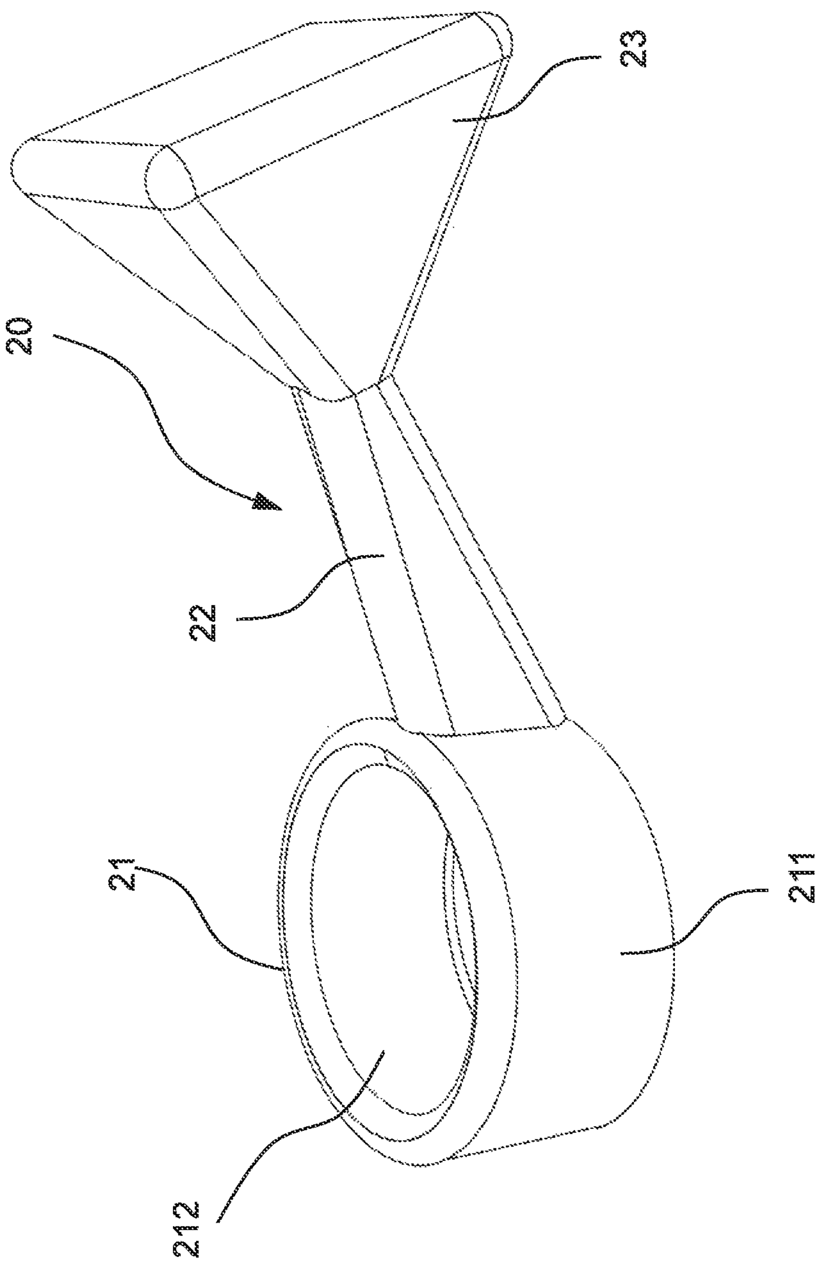

Furthermore, in a preferred embodiment of the present invention, the elastic collar 21, the elastic connection part 22 and the end 23 can be integrally formed with each other, but the present invention is not limited thereto. In a preferred embodiment of the present invention, each of the elastic collar 21 and the elastic connection part 22 can be made by silicone; the end 23 has a high friction surface or an elastic surface, or can be made by skin-friendly material, to make the stability and comfort of wearing the earphone when the end 23 is abutted with different position on the inner side of the auricle of the ear 30. In an embodiment, the end 23 can be in a cube shape or in a polygonal pyramid shape; for example, the polygonal pyramid shape can be a triangular pyramid shape or a quadrangular pyramid shape; as shown in FIGS. 6 and 7 in an embodiment, a top of the end 23 in the polygonal pyramid shape can be connected to the elastic connection part 22; in an embodiment, each corner of the polygonal pyramid shape can be a rounded corner.

Figure 2C:
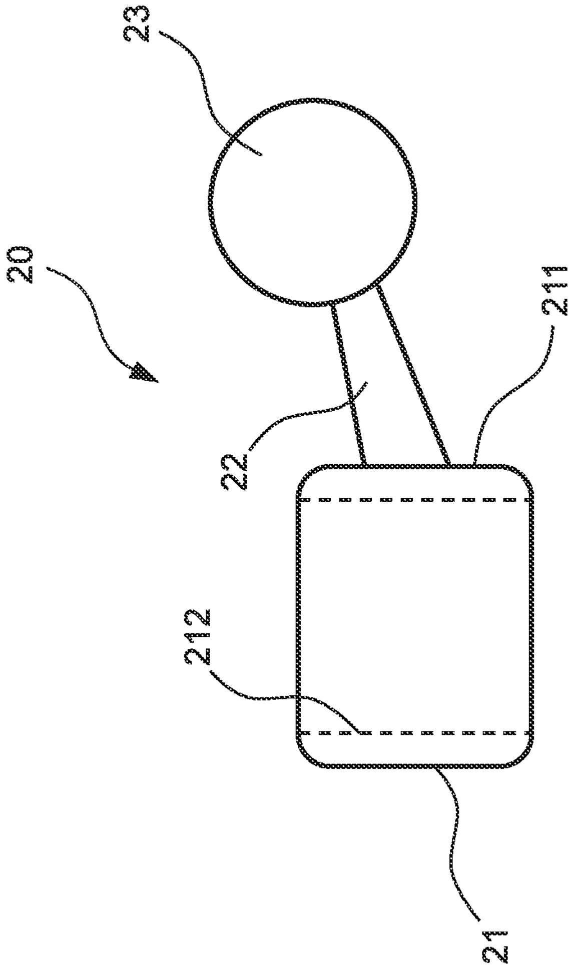
FIG. 2C is a side view of the second embodiment of an anti-drop hanging ring of earphone, according to the present invention.

Please refer to FIG. 2C, which shows a side view of an anti-drop hanging ring 20, according to a second embodiment of the present invention. As shown in FIG. 2C, the elastic connection part 22 has a lengthwise body outwardly and upward extended from the outer side 211 along a radial direction of the elastic collar 21, the elastic connection part 22 and the outer side 211 of the elastic collar 21 form an acute angle, and the end 23 extends beyond a plane of an upper end opening of the elastic collar 21. When the anti-drop hanging ring 20 of the present invention is assembled with the earphone 31 and the earphone 31 is worn on the ear 30, the elastic connection part 22 is extended outwardly and upwardly from the outer side 211, the end 23 can be close to the ear 30 in position, so that the user can easily adjust the different position of the end 23 abutted with the inner side of the auricle of the ear 30. The technical features and technical effect can be implemented on the anti-drop hanging ring 10 of the first embodiment of the present invention.

Figure 3A:
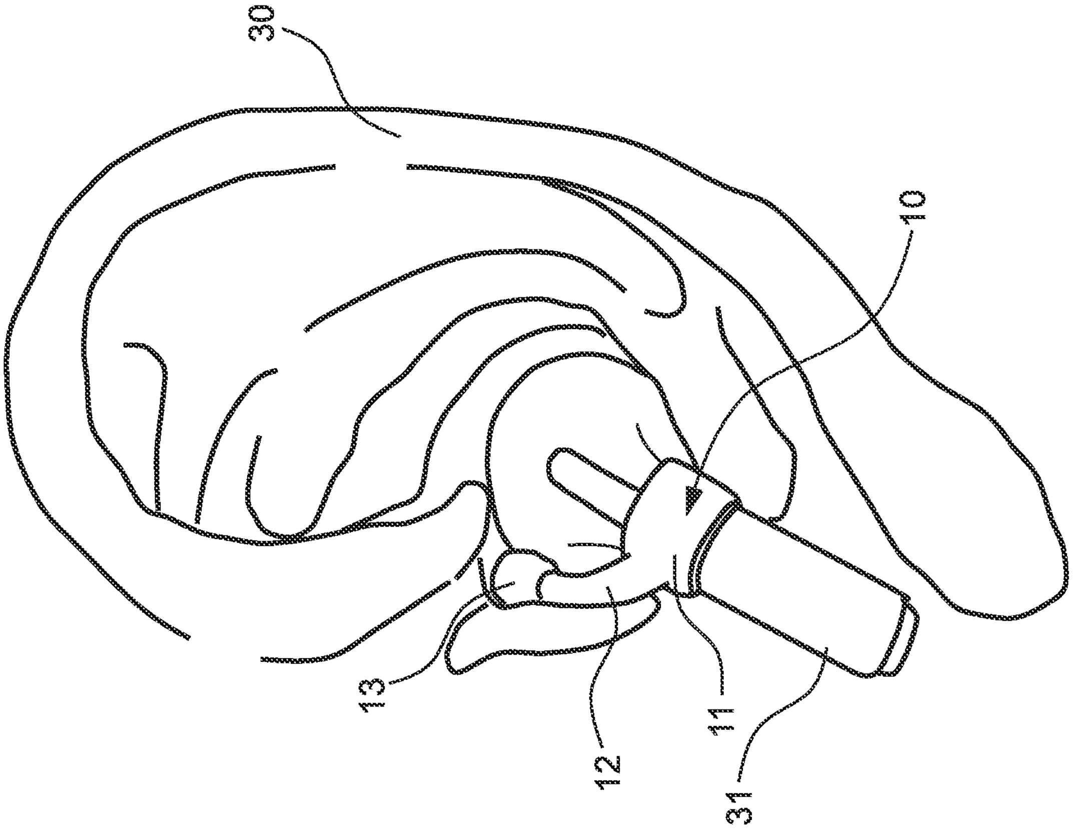
FIG. 3A to 3D are side views of manners of wearing the anti-drop hanging ring assembled with an AirPods earphone, according to the first embodiment of the present invention.
Figure 3B:
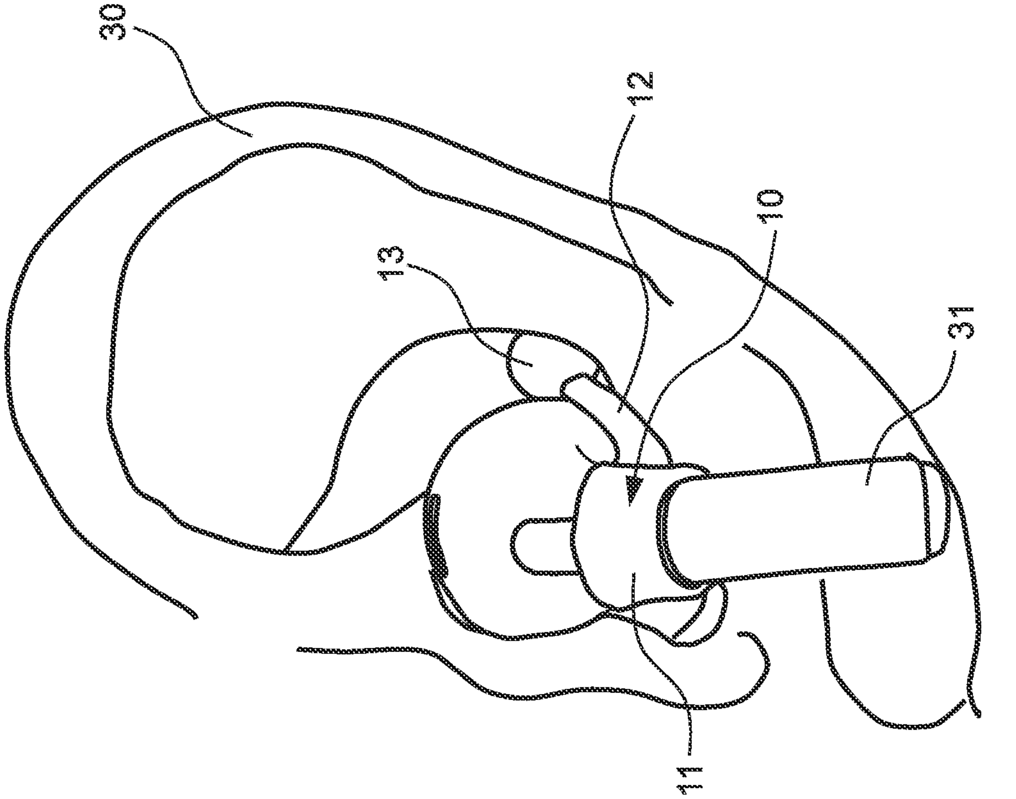
Figure 3C:
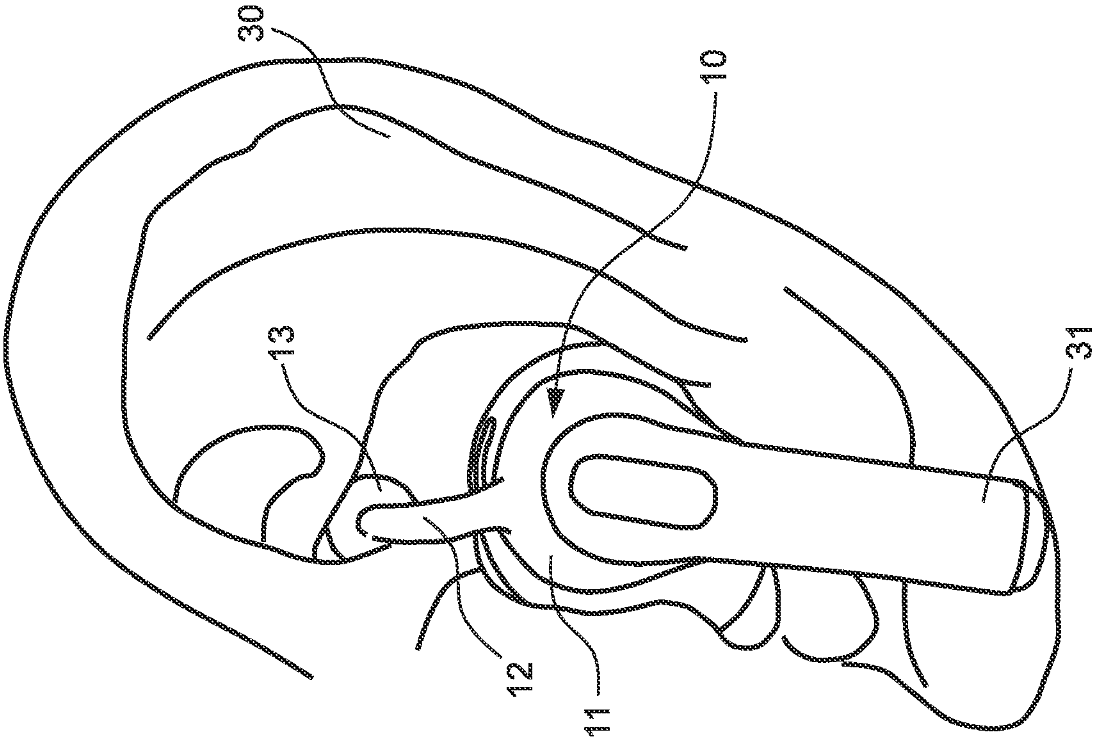
Figure 3D:
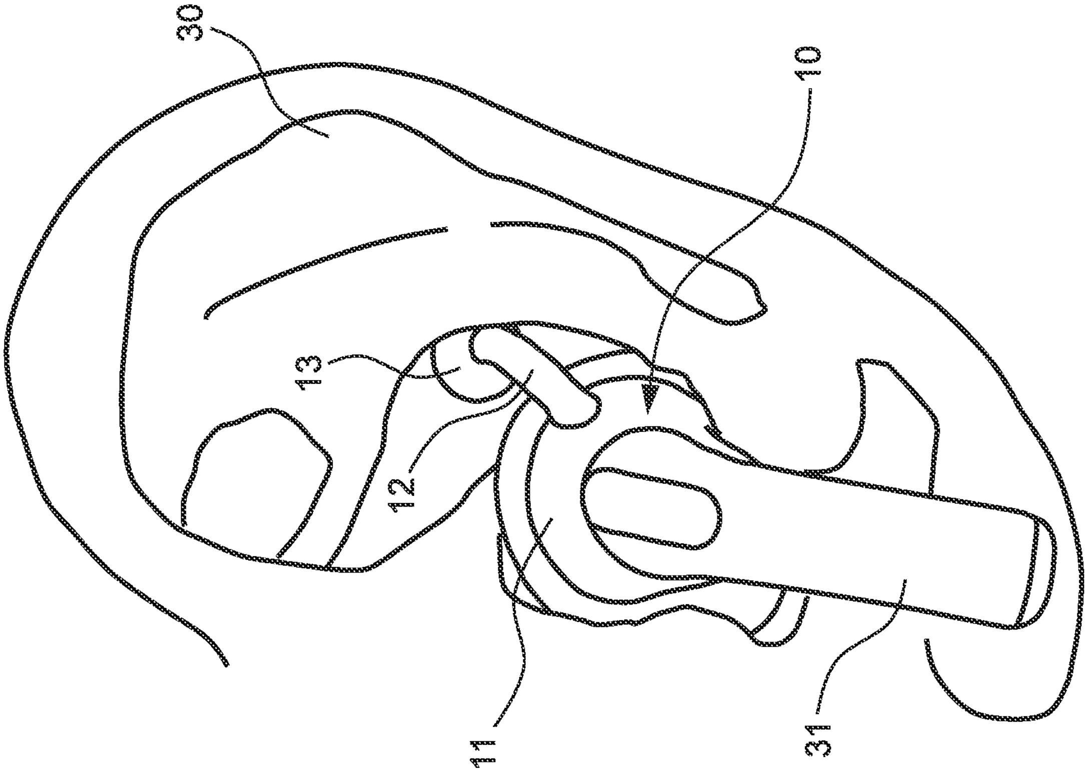

Please refer to FIGS. 3A and 3D, which are side views of manners of wearing the anti-drop hanging ring 10 assembled with the AirPods earphone 31, according to the first embodiment of the present invention. As shown in FIGS. 3A and 3D, the elastic collar 11 is mounted on different curve or cylinder of the AirPods earphone 31, the end 13 can be easily abutted with on the different position on the inner side of the auricle of the ear 30 through the elasticity of the elastic connection part 12.

Please refer to FIG. 4, which is a side view of a manner of wearing the anti-drop hanging ring 20 assembled with another AirPods earphone 31, according to the second embodiment of the present invention. The second embodiment of the present invention is for the user who has an ear 30 with a larger auricle, a smooth surface of AirPods earphone 31 is not conducive to rest in the user's ear canal. Therefore, the end 23 with a larger sphere can be easily supported by a periphery part of the auricle, so that the AirPods earphone 31 is not easy to drop from the ear canal.

Please refer to FIGS. 5A and 5B, which are side views of manners of wearing the anti-drop hanging ring 10 assembled with different bean-shaped earphone 31, according to the first embodiment of the present invention. Some bean-shaped earphones 31 do not have earplugs, and are supported by the bean-shaped shell resting on an auricle, and it may easily cause the wearing of earphone to be unstable due to the user's movement. In the first embodiment of the present invention, the upper and lower end openings of the elastic collar 11 have different internal diameters, so that the inner side 112 of the elastic collar 11 can be easily attached with the curved surface of different bean-type earphone 31, and the elastic connection part 12 has a lengthwise body outwardly and upward extended from the outer side 211 along a radial direction of the elastic collar 11, the end 13 can be closer to the ear 30 in position, so that the user can easily adjust the different position of the end 13 abutted with the inner side of the auricle of the ear 30.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An anti-drop hanging ring of earphone, comprising:
- an elastic collar, having an outer side and an inner side;
- an elastic connection part, disposed on the outer side of the elastic collar; and
- an end, disposed on a portion of the elastic connection part away from the elastic collar, wherein the elastic collar is configured to attach with an earphone, when the earphone is worn on an ear, the end is abutted with an auricle of the ear;
- wherein outer sides of the elastic connection part and the elastic collar form an acute angle, and the elastic connection part has a lengthwise body outwardly and upward extended from one of the outer sides along a radial direction of the elastic collar, to make the end extend beyond a plane of an end opening of the elastic collar.

2. The anti-drop hanging ring of earphone according to claim 1, wherein the elastic connection part is in a cylinder shape.

3. The anti-drop hanging ring of earphone according to claim 1, wherein the end is in a sphere shape.

4. The anti-drop hanging ring of earphone according to claim 1, wherein the elastic collar, the elastic connection part and the end are integrally formed with each other.

5. The anti-drop hanging ring of earphone according to claim 1, wherein the elastic collar has a notch.

6. The anti-drop hanging ring of earphone according to claim 1, wherein an inner side of the elastic collar forms a closed hole.

7. The anti-drop hanging ring of earphone according to claim 6, wherein two end openings of the closed hole have different internal diameters.

8. The anti-drop hanging ring of earphone according to claim 1, wherein at least one of the elastic collar, the elastic connection part and the end is made by silicone.

9. The anti-drop hanging ring of earphone according to claim 1, wherein a portion of the elastic connection part near the elastic collar is thicker than another portion of the elastic connection part near the end.

10. The anti-drop hanging ring of earphone according to claim 1, wherein the end has a high friction surface or an elastic surface.

11. The anti-drop hanging ring of earphone according to claim 1, wherein the end is in a cube shape.

12. The anti-drop hanging ring of earphone according to claim 1, wherein the end is in a polygonal pyramid shape.

13. The anti-drop hanging ring of earphone according to claim 12, wherein the end is in a triangular pyramid shape.

14. The anti-drop hanging ring of earphone according to claim 12, wherein the end is in a quadrangular pyramid shape.

15. The anti-drop hanging ring of earphone according to claim 12, wherein a top of the end in the polygonal pyramid shape is connected to the elastic connection part.

16. The anti-drop hanging ring of earphone according to claim 12, wherein each corner of the polygonal pyramid shape is a rounded corner.

* * * * *